Figure 1:
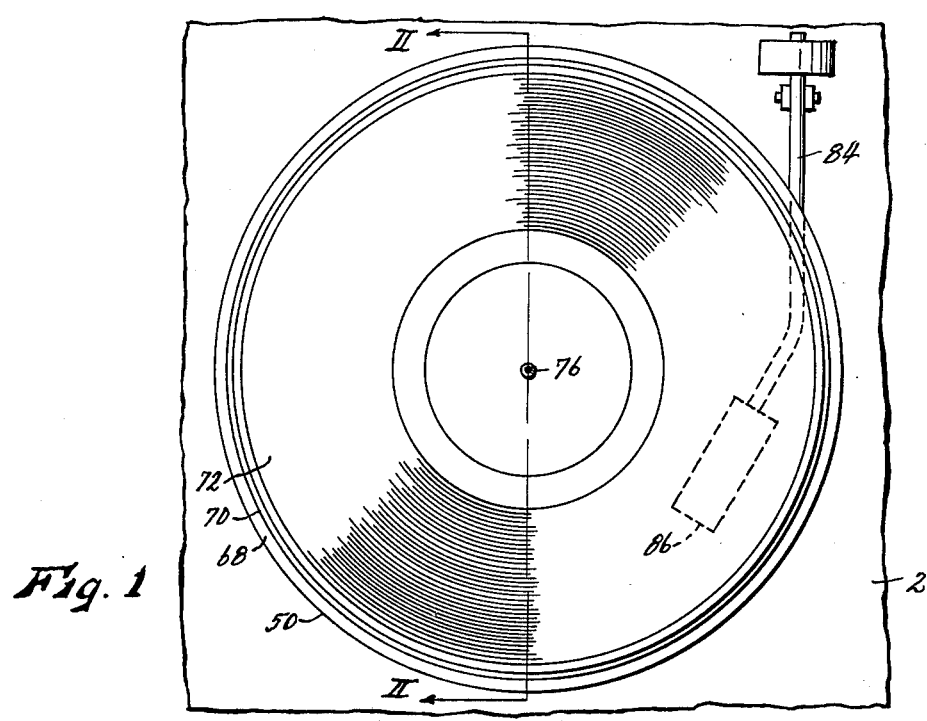

United States Patent [19]

Short

[11] 4,018,447
[45] Apr. 19, 1977

[54] PHONOGRAPH TURNTABLE

[76] Inventor: Bruce H. Short, 3537 State Line, Kansas City, Mo. 64111

[22] Filed: Feb. 2, 1976

[21] Appl. No.: 654,613

[52] U.S. Cl. .............................. 274/10 R; 274/39 R
[51] Int. Cl.² ........................................ G11B 15/00
[58] Field of Search ................. 274/39, 10 B, 10 S, 274/10 R

[56] References Cited

UNITED STATES PATENTS 2,291,538   7/1942   Ebert ............................... 274/10 R Primary Examiner—Richard E. Aegerter
Assistant Examiner—John W. Shepperd
Attorney, Agent, or Firm—John A. Hamilton

[57] ABSTRACT

A phonograph turntable adapted to allow the playing of a plurality of records in automatic sequence, but in which no record ever touches any other record or any other element in relation to which it has a relative movement, excepting of course the stylus of the tone arm. Generally, this object is accomplished by providing each record with its own individual turntable, and handling the turntables in a manner similar to that in which the records themselves are handled in prior automatic record changers.

2 Claims, 4 Drawing Figures

U.S. Patent  April 19, 1977  Sheet 1 of 2  4,018,447

PHONOGRAPH TURNTABLE

This invention relates to new and useful improvements in automatic record changing turntables for phonographs of the type permitting the playing of a series of records in automatic sequence. Phonographs with automatic record changers are of course in common use, but certain problems have heretofore been commonly associated with their usage.

These problems arise mainly from the fact that in all prior changers within my knowledge, the records, at some stages of operation, are brought into frictional sliding engagement with each other, or with elements of the changer itself, which can cause damage to the delicate sound track grooves of the records. In most prior changers, the selected records are piled one on the other in a stack supported at the upper end of a vertical spindle projecting upwardly from the center of the rotating turntable, being lodged on a horizontal ledge of the spindle formed by offsetting the top portion of the spindle eccentrically. In the record changing cycle, after one record has been played and the tone arm moved out of the way, the bottom record of the stack is moved transversely, in its own plane, to move its center hole into coaxial relation with the lower portion of the spindle, and the record falls to the turntable by gravity. This transverse movement is accompanied by frictional sliding of the bottom record against the next higher record in the stack, pressed thereagainst by the full weight of the stack, and damage to the delicate grooves of the records can occur, resulting in decreased fidelity of sound reproduction. Also, as each record (after the first record) is dropped, while not rotating, it falls to the top of the record just played, which is of course rotating with the turntable. The rotational inertia of the newly dropped record must of course be overcome to bring it up to the speed of the record on which it rests. This acceleration of the newly dropped record requires time, and during this interval further damaging frictional sliding contact between the records occurs. This type of damage is multiplied if either of the contacting records is warped, since slippage then occurs more readily. In fact, slippage often occurs between records more or less continuously, even if they are not warped, and this not only causes further record damage, but also causes defective sound reproduction by allowing the rotational speed of the record to vary. Finally, records on the turntable of course rotate, while the center spindle does not. This can cause frictional wear between the record and the spindle at the center hole of the record, and result in enlargement of the center hole of the record, allowing the record to rest in a slightly eccentric position on the turntable, which also can cause faulty sound reproduction. The mechanism which functions to slide each record off of the ledge of the spindle also engages the record at its center hole, and can cause irregular wear of the record surrounding its center hole. All in all, many audiophiles simply refuse to use automatic record changers at all, electing to suffer the inconvenience of changing each record manually in preference to risking the damage to their valuable and irreplaceable records which might be caused by automatic changers.

Accordingly, the primary object of the present invention is the provision of a phonograph turntable and record changer which completely eliminates any possibility of any of the types of record damage above enumerated, while at the same time permitting the playing of a series of records in a completely automatic sequence.

Another object is the provision of an apparatus of the character described in which no record ever touches any other record, so that any possibility of damaging relative sliding movement therebetween is eliminated. Generally, this object is accomplished by providing each record with its own individual turntable, all relative movements of the records formerly accomplished by direct handling of the records being accomplished by handling of the turntables.

A further object is the provision of an apparatus of the character described in which the central spindle supporting and guiding the various turntables, while non-rotating, is completely shielded from contact with the records themselves, thereby avoiding enlargement or other damage to the center holes of the records.

Other objects are simplicity and economy of construction, and efficiency and dependability of operation.

Figure 4:
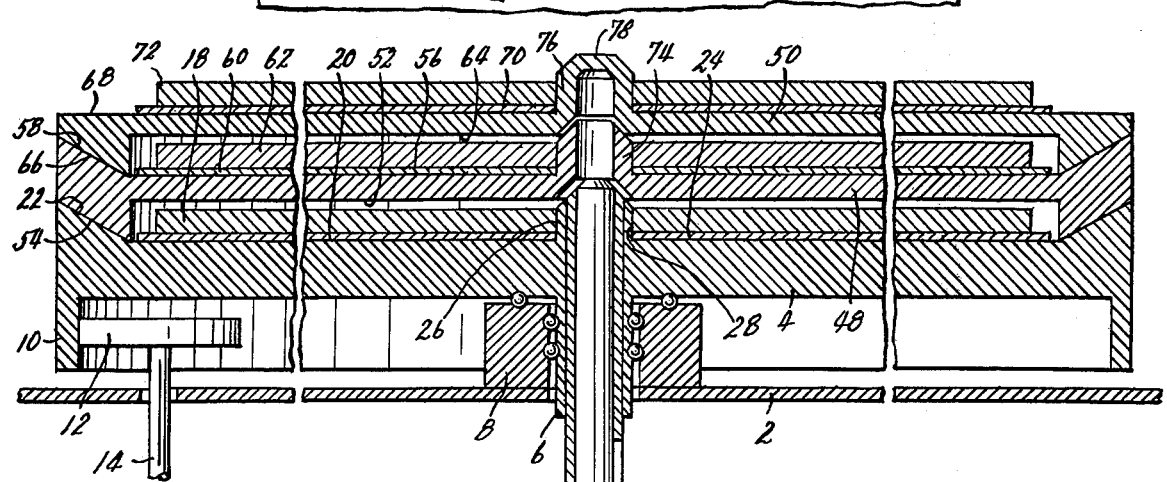
Figure 4:
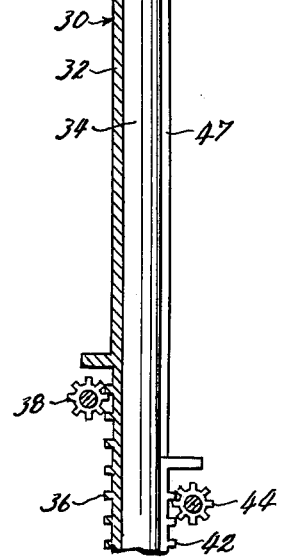
Figures 2, 3:
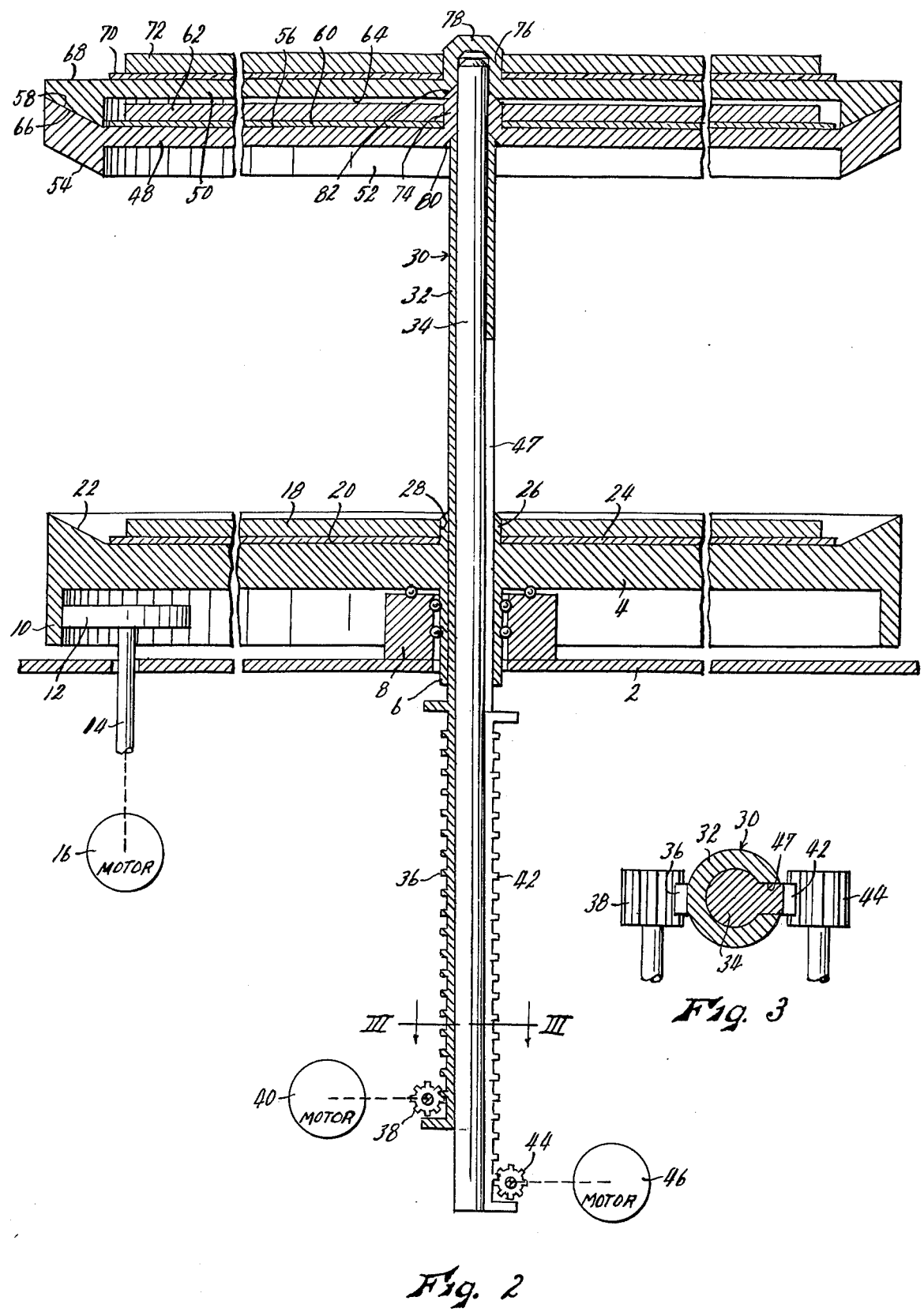

With these objects in view, as well as other objects which will appear in the course of the specification, reference will be had to the accompanying drawing, wherein:

FIG. 1 is a fragmentary top plan view of a phonograph turntable deck, including a record changer embodying the present invention, FIG. 2 is a partially schematic enlarged sectional view taken on line II—II of FIG. 1, partially broken away and foreshortened, FIG. 3 is an enlarged, fragmentary sectional view taken on line III—III of FIG. 2, and FIG. 4 is a view similar to FIG. 2, but showing both of the auxiliary turntables lowered to rest on the main turntable.

Like reference numerals apply to similar parts throughout the several views, and the numeral 2 applies to the horizontal stationary platform of a turntable deck. A main turntable 4 is disposed just above the platform, being circular in a horizontal plane and provided centrally with a depending tubular hub 6 carried for rotation on a vertical axis by a bearing 8 mounted on platform 2. Said main turntable is provided with a depending peripheral skirt 10, and is driven rotatably at the desired speed by a friction wheel 12 engaging the inner periphery of said skirt. Said friction wheel is mounted on a vertical shaft 14 extending downwardly through platform 2 and powered by an electric motor 16 (see FIG. 2) or other suitable means. The diameter of the turntable is greater than that of the record 18 to be supported thereby, and its top surface is concentrically recessed to form a horizontal flat surface 20 also of greater diameter than the record. Its peripheral top surface 22 is flared outwardly and upwardly in conical form. Surface 20 has affixed thereto an anti-friction record cushion 24 formed of felt, soft rubber or the like, on which record 18 is supported. The depth of surface 20 below the extreme top plane of the turntable is somewhat greater than the combined thickness of cushion 24 and record 18.

Turntable 4 is provided centrally with an upstanding tubular spindle 26 of a diameter to engage in the center hole 28 of the record, and the top end of said spindle is conically bevelled to facilitate the application of the record thereover. The effective height of this spindle is slightly less than the total depth of the top recess of the turntable.

Extending vertically though turntable 4 is a center post indicated generally by the numeral 30. Said center post is engaged rotatably in spindle 26 and hub 6 of the turntable, but is itself non-rotatable, the turntable rotating thereabout. Said center post consists of an outer tubular sleeve 32 and a central rod 34, said sleeve and rod being slidable longitudinally relative to each other, and said sleeve being longitudinally slidable in turntable 4. The center post projects at all times below turntable platform 2. The downwardly extending portion of sleeve 32 is provided with a longitudinally extending gear rack 36 with which is meshed a pinion gear 38 driven by an electric motor 40 or the like, whereby said sleeve may be moved between an elevated position as shown in FIG. 2, and a lowered position as shown in FIG. 4. The downwardly extended portion of rod 34 is provided with a longitudinally extending gear rack 42 with which is meshed a pinion gear 44 driven by an electric motor 46, whereby said rod may be moved between the elevated position of FIG. 2 and the lowered position of FIG. 4. Rack 42 projects radially outwardly through a longitudinal slot 47 of sleeve 32, and said slot is of such length that sleeve 32 may be fully lowered before rod 34 is lowered. When both the sleeve and the rod are in their lowered positions, as shown in FIG. 4, their bevelled upper ends coincide with the upper end of spindle 26 of turntable 4 to form a smooth conical surface over which the center hole 28 of record 18 may be easily applied. When elevated, sleeve 32 and rod 34 are adapted respectively to support a first auxiliary turntable 48 disposed directly above main turntable 4, and a second auxiliary turntable 50 disposed above turntable 48, both of the auxiliary turntables being of the same diameter as main turntable 4. The bottom surface of turntable 48 is concentrically and cylindrically recessed, as at 52, to a depth and diameter equal to that of the central recessed top surface 20 of turntable 4, and the peripheral portion of its lower surface is flared conically upwardly and outwardly, as at 54, at an angle equal to that of surface 22 of turntable 4. The top surface of turntable 48 is recessed identically to the top surface of turntable 4, providing a central planar surface 56 and an upwardly and outwardly flared conical peripheral edge portion 58. Surface 56 carries a record cushion 60 and a second record 62. Auxiliary turntable 50 has its lower surface recessed, as at 64, in precisely the same manner as the lower recess 52 of turntable 48, with its peripheral portion flared upwardly and outwardly in conical form, as at 66. Its top surface 68 may be completely planar, and supports a record cushion 70 and a third record 72. Turntables 48 and 50 are provided respectively with tubular center spindles 74 and 76, corresponding in external diameter to the center holes of the records, and in internal diameter to the diameter of center post rod 34, so as to admit said rod therein, but not the sleeve 32 of the center post. Spindles 74 and 76 are both bevelled at their upper ends to facilitate the application of records thereover, the effective height of spindle 74 of turntable 48 being slightly less than the effective depth of the top recess of that turntable, and the top end of spindle 76 is closed as indicated at 78. The lower surface of each of turntables 48 and 50, within bottom recesses 52 and 64 thereof, may be further conically recessed around the central aperture thereof, as indicated respectively at 80 and 82, if necessary to accomodate the bevelled upper end of the spindle of the next lower turntable, although these bevelled surfaces are prevented from engaging by the engagement of the bevelled peripheral surfaces of the turntables. When both the sleeve 32 and rod 34 of center post 30 are fully elevated, as in FIG. 2, turntable 48 rests on sleeve 32 of the center post, by engagement of the top end of said sleeve in bottom recess 80 of the turntable, and turntable 50 rests on turntable 48 by engagement of their peripheral surfaces 66 and 58, while center post rod 34 projects upwardly into spindle 76 of turntable 50, but not to the closed upper end 78 of said spindle. Both of turntables 48 and 50 may easily be lifted free of the upper end of rod 34.

In operation, record 18, turntable 48, record 62, turntable 50 and record 72 are stacked sequentially over main turntable 4. This loading may be done either with center post 30 fully lowered, as in FIG. 4, in which case the elements are piled directly on turntable 4, or with the center post fully elevated as in FIG. 2, in which case turntables 48 and 50 and their records are supported by the center post as shown. If loaded in the first manner described, both elements of the center post are then elevated to the FIG. 2 position. Then, with main turntable 4 being rotated by motor 16, the tone arm 84 of the phonograph, which is carried by platform 2, is moved over record 18, and its stylus (not shown) carried by head 86 thereof, is lowered into tracking engagement with the spiral sound groove of said record to reproduce the sounds recorded therein, in a manner well known in the art and not considered in itself to be pertinent to the present invention. After the playing of record 18 is completed, tone arm 84 is moved laterally outside the periphery of the turntables, and motor 40 is actuated to lower sleeve 32 of center post 30 to lower auxiliary turntable 48 to reset on main turntable 4, contact between these turntables being solely at the peripheral conical surfaces 22 and 54 thereof, since after these surfaces engage, sleeve 32 is lowered still further, to a slight degree, as shown in FIG. 4, to prevent any further contact between the upper end of the sleeve and the lower surface of turntable 48. This separation is desirable since turntable 48 is rotated solely by engagement of its periperal edge portion 54 with the corresponding edge portion edge portion 22 of the main turntable. Surfaces 22 and 54 may be provided with a satin finish, or otherwise roughened, to provide an efficient frictional drive for turntable 48, said drive having a moment arm equal to the full radius of the turntable, while slippage could easily occur if the auxiliary turntable were driven by engagement of main turntable spindle 26 with the auxiliary turntable. As the lowering of turntable 48 is commenced, turntable 50, supported on turntable 48, is also lowered, but only slightly, or until the closed upper end 78 of spindle 76 of turntable 50 rests on the upper end of rod 34, so that ample vertical space is left between turntables 48 and 50 for tone arm 84 to move over record 62 of turntable 48 to reproduce the sounds recorded thereon. After the playing of record 62 is completed and tone arm 84 is again moved laterally outside the periphery of the turntables, motor 46 is actuated to lower rod 34 of the center post to the position shown in FIG. 4, thereby lowering turntable 50 to bring its lower peripheral surface 66 into engagement with the upper peripheral surface 58 of turntable 48, whereby turntable 50 is rotatably driven. Here again, surfaces 58 and 66 support turntable 50 out of engagement with spindle 74 of turntable 48, so that the drive of turntable 50 is peripheral only. Tone arm 84 then moves over record 72 of turntable 50 to reproduce the sounds recorded thereon in the same manner as before. The controls for the timing, duration and sequence of the operation of motors 40 and 46 may be of any suitable type, and may be fully automatic, although their specific nature is not considered to be pertinent to the present invention, and is not shown. Usually, of course, the tone arms of automatic phonographs are equipped with apparatus automatically operable by an inward "overtravel" of the arm after the playing of a record is completed to lift the tone arm out of engagement with the record and move it laterally outside the periphery of the turntable. At the extremity of its outward movement, it actuates a mechanical record dropping mechanism to drop another record to the turntable, and after a pause sufficient to allow the record to drop, again moves inwardly to play the newly dropped record. It may also shut off the main turntable drive motor 16 after the last record is played. In the present device, the outward lateral movement of the tone arm, after each record is played, may be utilized to actuate electrical switches controlling motors 40 and 46 in the proper sequence.

Thus it will be apparent that a phonograph having the desired functions has been produced. Although it is capable of permitting the playing of a series of records in fully automatic sequence, it nevertheless is not subject to any of the record damage problems commonly associated with automatic record changers. No record ever touches or contacts any other record, so there can be no rubbing or friction therebetween, such contacts being the major cause of record damage in prior record changers. Also, no record has rotating or wiping contact with any turntable or any other element of any sort whatsoever. Even the center hole of each record, which ordinarily engages a non-rotating center spindle and is therefore subject to wearing enlargement, engages only a spindle which is integral with its turntable and rotates therewith. Neither does any element of the turntable positioning mechanism, namely center post 30 and its operating elements, ever touch the records. Only the main turntable need be power driven, the auxiliary turntables being driven by contact with the main turntable, thus simplifying the mechanics of the record changing function. As actually shown, the number of records which can be handled is limited by the number of sleeves which can be carried on rod 34 of the center post, which in turn is limited by the diameter of the center holes of the records, which is generally standardized at one-quarter inch. More than the three records shown can be accomodated even with these limitations. The sleeve walls would then become progressively thinner, but the elevated auxiliary turntables are always braced against tilting by the insertion of rod 34 through their spindles, not merely by the thin sleeve 32 supporting the lowermost of the elevated auxiliary turntables. Also, within the purview of the present invention, the auxiliary turntables could be raised and lowered by means other than the telescoping center post described, such as, for example, by elevator fingers engageable with the peripheral edge portions of the auxiliary turntables. The conical configuration of the interengaging peripheral edge portions 22–54 and 58–66 of the turntables assists in providing a centering action as each turntable is lowered into playing position, and as previously mentioned these surfaces may be provided with a satin finish, or otherwise roughened, to provide ample driving friction for each auxiliary turntable. Any slippage or friction which may occur as each turntable is brought up to playing speed is borne by these surfaces not by the records themselves.

While I have shown and described a specific embodiment of my invention, it will be readily apparent that many minor changes of structure and operation could be made without departing from the spirit of the invention.

What I claim as new and desire to protect by Letters Patent is:

1. A record selector comprising:
   a. a generally circular horizontal main turntable rotatable about its vertical axis and adapted to carry a phonograph record concentrically thereon for playing,
   b. drive means operable to rotate said main turntable,
   c. a plurality of auxiliary turntables disposed above and concentrically with said main turntable, and each adapted to carry a phonograph record concentrically thereon,
   d. means supporting said auxiliary turntables, and
   e. operating means controlling said turntable supporting means to raise said auxiliary turntables to a spaced apart relation above said main turntable to admit the tone arm of the phonograph above the record carried by said main turntable, and to lower said auxiliary turntables successively, the first auxiliary turntable engaging said main turntable, but not the record carried by said main turntable, to be driven frictionally thereby to permit playing of the record carried by said first auxiliary turntable by said tone arm, the second auxiliary turntable engaging said first auxiliary turntable, but not the record carried thereby, to be driven frictionally thereby to permit playing of the record carried by said second auxiliary turntable by said tone arm, and so on, said turntable supporting means and said operating means comprising a vertical center post disposed concentrically with said turntables and cooperating with central apertures formed therefor in said turntables, said center post consisting of a plurality of concentrically telescoped sections, the diameter of the central aperture of the main turntable being sufficient to pass all sections of said post slidably therethrough, the diameters of the central apertures of successively higher auxiliary turntables being successively reduced to pass successively one less outer section of said post therethrough, the diameter of the central apertures of the two topmost auxiliary turntables being sufficient to admit only the central section of said post, the central aperture of the topmost auxiliary turntable being closed to prevent the passage of said central post section therethrough, and means operable to raise and lower the sections of said center post independently of each other.

2. A phonograph turntable as recited in claim 1 wherein each of said turntables is provided with an upstanding central spindle, fixed to and rotatable with its associated turntable, over which the center hole of the associated phonograph record is adapted to be engaged, said spindles being tubular to provide the central turntable apertures cooperating with said center post.

* * * * *